INVENTORS
OLIVIER de KERVENOAËL
ALAIN VIRNOT
BY
Bacon & Thomas
ATTORNEYS

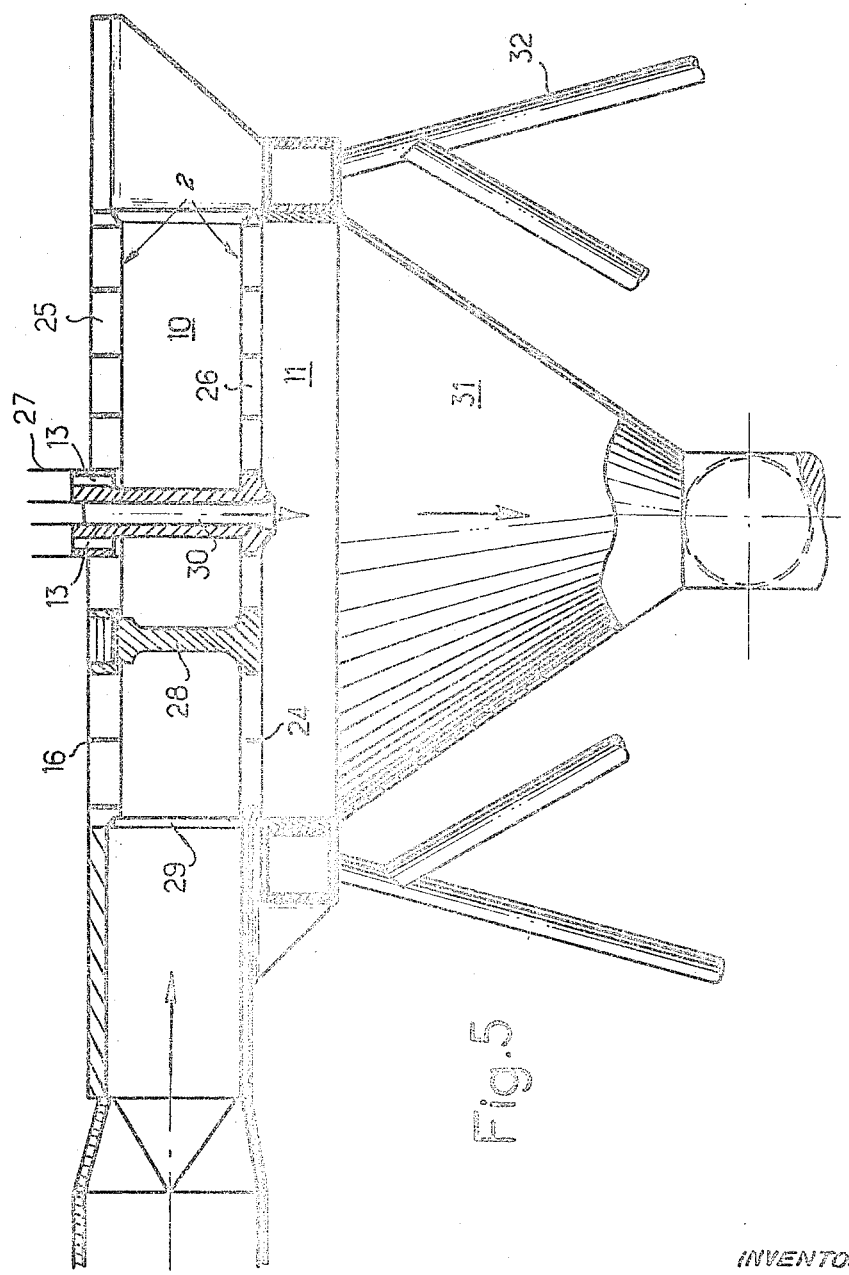

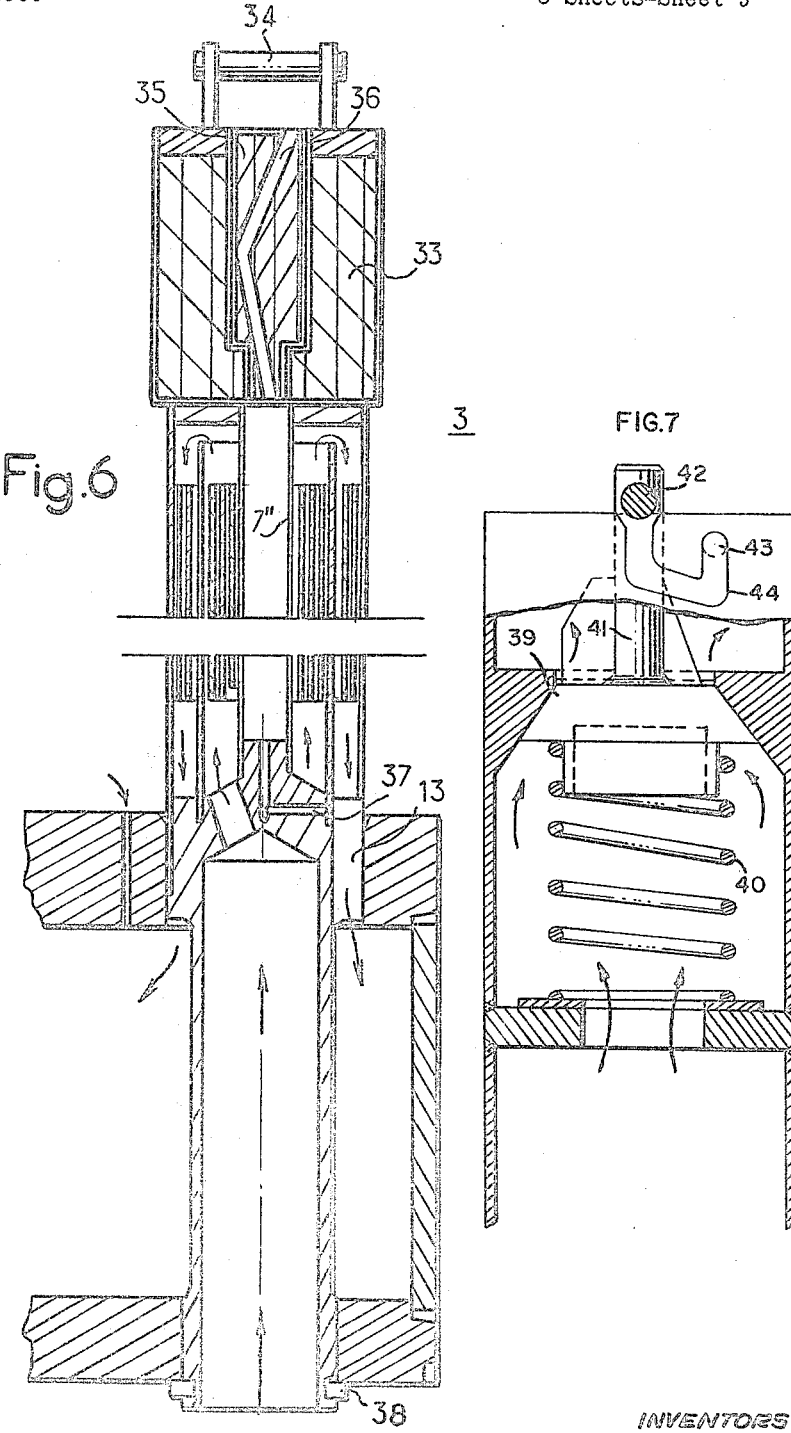

3,318,777
COOLING PROCESS FOR FUEL ELEMENTS OF A NUCLEAR REACTOR OF THE SWIMMING-POOL TYPE AND NUCLEAR REACTOR ACCORDING TO THIS PROCESS
Olivier de Kervenoaël and Alain Virnot, Paris, France, assignors, by mesne assignments, to American Machine & Foundry Co., a corporation of New Jersey
Filed Dec. 27, 1960, Ser. No. 78,492
Claims priority, application France, Jan. 7, 1960, 814,996
11 Claims. (Cl. 176—61)

Swimming-pool reactors as known at present can be divided into substantially two main types, which are:

Swimming-pool reactor in which the water which surrounds the fuel elements also acts as a coolant, moderator and shield;

Swimming-pool reactors of the "tank" type, in which the core is enclosed in sealed manner in a reservoir traversed by the cooling water, the circuit of which is independent of the pool water.

Unfortunately, these two kinds of swimming-pool reactor have certain disadvantages which limit their scope of application.

In connection with reactors of the first-mentioned kind, their power is limited fairly rapidly (to a value of the order of 3 to 5 mv.) by the activity acquired by the water during its travel through the core, which activity results in an excessive amount of radiation for the experimenters if this water is allowed to re-ascend directly to the surface. Several solutions can be contemplated for overcoming this disadvantage; for example, passage of the pool water through the core, combined with passage of this water into a decontamination bath, then over ion exchange resins; unfortunately, the output required in order to exceed the power of known swimming-pool reactors in this manner is too great for the possibility of passing it wholly through a resin bed to be considered. It has also been proposed to use an upper layer of hot water, oil or alcohol at the pool surface or even a cover of plexiglass one or two metres below the water level. These procedures are not very efficient or else they affect the accessibility of the core, thus losing practically all the interest in swimming-pool reactors.

In connection with reactors of the second kind, provided with a tank, it has been possible to obtain higher powers with them by enclosing the core in a cooled, sealed reservoir in a closed circuit. In spite of certain undeniable advantages of this kind of reactor, the increase in power obtained thereby is largely counterbalanced by the fact that tank reactors are large installations which no longer have the simplicity of standard swimming-pool nuclear piles; moreover, the accessibility of the core is adversely affected by the provision of the reservoir, the cover of which must be removed by remote control in order to reach the fuel elements or to introduce experiments into the centre of the core.

The object of the present invention is to overcome the afore-mentioned disadvantages. To this end, it relates to a cooling process for the fuel elements of a nuclear reactor of the swimming-pool type, characterised in that a circulation of cooling water in opposing directions is effected inside each autonomous envelope containing at least one fuel element, and a part of the pool water located in the vicinity of the fuel elements is introduced into the cooling circuit, the water of the cooling circuit then being partially returned to the pool after decontamination.

The process according to the invention makes it possible to maintain the versatility and accessibility of standard swimming-pool reactors while giving them the safety degree of tank type reactors and the possibility of attaining considerably higher powers.

The invention also relates to a nuclear reactor of the swimming-pool type for carrying out the process defined in the preceding paragraph, characterized by a cooling circuit for the assembly of fuel elements of the reactor and comprising means for introducing and evacuating the cooling water into and out of each envelope containing a fuel element, means for circulating the cooling water in opposing directions in each envelope, means for introducing into the cooling circuit a part of the pool water from the vicinity of the fuel elements and, finally, means for returning a part of the water from the cooling circuit to the pool, after decontamination.

According to one embodiment of the invention, each envelope containing a fuel element is divided into two compartments in each of which the cooling water circulates in opposite directions, collection of this water at the inlet and outlet of each envelope being ensured by a two-tier lattice structure provided with orifices in which the lower ends of the envelopes are arranged to fit in substantially sealed manner.

In most cases, the two compartments are concentric; in order to facilitate explanation, reference will be made below to this case only, it being understood that the fuel elements used within the scope of the invention can be of any type known for swimming-pool reactors, for example, rectangular or hexagonal.

In this manner, the autonomy of the cooling water of the pool is effected without the need for enclosing the assembly of the active part of the reactor in a reservoir; according to the invention, each fuel unit comprising one or more elements is enclosed separately in a tube with which it is integral and which is traversed by the cooling water. Thus, this tube is part of the fuel element itself and constitutes, as it were, a "force tube"; the fuel elements are double-current elements and the cooling water circulates inside along a hair-pin path, the partition between the two compartments containing fissile material in certain cases.

The circulation of water in an element can occur in two different directions; ascension of the water in the outer compartment of the element and then, after reversal of the direction of flow at the top, descent in the central compartment, or, on the contrary, ascension in the central compartment with descent in the outer compartment.

Other improvements according to the invention, preferably used in combination with the particular form of the elements mentioned above, make it possible to effect decontamination of the part of the pool water in which the elements are immersed. To this end, inlet of the pool water through suitable orifices connecting the latter with the cooling circuit is effected by withdrawing a small amount from the circuit of cooling water; this withdrawn cooling water is then returned to the pool water, after passing through a decontamination bath and over ion exchange resins. The interest of this decontamination is two-fold;

on the one hand, it permits cooling of the pool water surrounding the fuel element and, on the other hand, recovery thereof so that it can be decontaminated. (This water can be active either as a result of direct radiation or because losses have occurred from the cooling circuit.)

The afore-mentioned orifices can comprise either perforations provided directly in the lattice structure (this is absolutely essential when the fuel elements employed can be completely enclosed) or openings in the form of inlets provided at the upper end of each element.

In the case where the cooling output through the element would lead to high losses of charge (of the order of several kg./cm.²), it is advantageous to cause the inward flow of the pool water to enter the cooling circuit at a point downstream of the element; in this case, if it is desired to avoid all risk of loss of cooling water towards the pool at the level of the lattice structure, it is necessary to employ a direction of circulation corresponding to ascension of the water in the central compartment and, consequently, to provide means for securing the element on the lattice structure in order to avoid displacement thereof by the upstream pressure.

In certain embodiments of the invention, the upper orifice provided in the fuel elements can be remotely opened or closed at will by means of a control rod of the kind used for handling the fuel element.

In other embodiments, this orifice is closed by an automatic valve when a strong flow of water traverses the element.

It is necessary for it to be possible to open the top of the element in order to be able to evacuate the residual power by natural convection, some time after stoppage of the nuclear pile.

The process of the invention makes it possible to introduce into the purifying circuit a flow which is much lower (5% for example) than that of the cooling flow. As a result, circulation of the water in the purifying circuit is much lower (the circulation time can even be increased by using an additional bath) and purification is made considerably easier; in fact, the activity of the short-life radioactive elements is considerably decreased and the long-life elements, generally ionised, are fixed to the ion exchange resins. Thus, because of the substantial sealing of the cooling circuit, only properly decontaminated water is returned to the pool.

The degree of sealing of the decontamination circuit against the pool water is not critical; in fact, since the volume of cooling water is constant, whatever the standard of this sealing, the flow of pool water introduced into the cooling circuit is always equal to that withdrawn from this circuit, increased by the flow losses. The point at which this withdrawal is effected is not critical, even though it is advantageous to effect it upstream of the fuel elements and after the thermal exchange, so as to send only cold water to the resins sensitive to temperature.

The essential advantage of the improvements according to the invention resides in the simultaneous attainment of an increased power and greater safety in operation. The considerable increase in the safety factor is due to the fact that if damage occurs in one fuel element, the fission products emitted do not contaminate all the pool water; moreover, with correct dimensions of the ion exchangers, all the fission products can be restrained and the flow time through the auxiliary circuit can be up to about ten minutes for example, and thus allow the operator to take top security measures.

Finally, in certain embodiments of the invention, each fuel element, particularly if it is of the kind sealed at its upper part, can be surmounted by a lead brick; this known device, which increases the power of the reactor without increasing the height of the shielding water above the core is advantageously used in combination with the improvements according to the present invention.

With reference to the accompanying diagrammatic FIGURES 1–7, there are described below, by way of example only, several embodiments of the improvements in nuclear reactors of the swimming-pool type according to the invention.

FIG. 5 is a sectional view along the axis of the lattice structure of a swimming-pool reactor, improved according to the invention;

FIG. 6 is a fuel element according to the invention, of the kind closed at its upper end and surmounted by a lead brick;

FIG. 7 is a view of the upper part of a fuel element of the closed type, provided with remotely-controlled opening means.

The drawings only include those members necessary to an understanding of the invention, corresponding members of the different figures, which are identical, having the same reference numerals.

Figure 1:
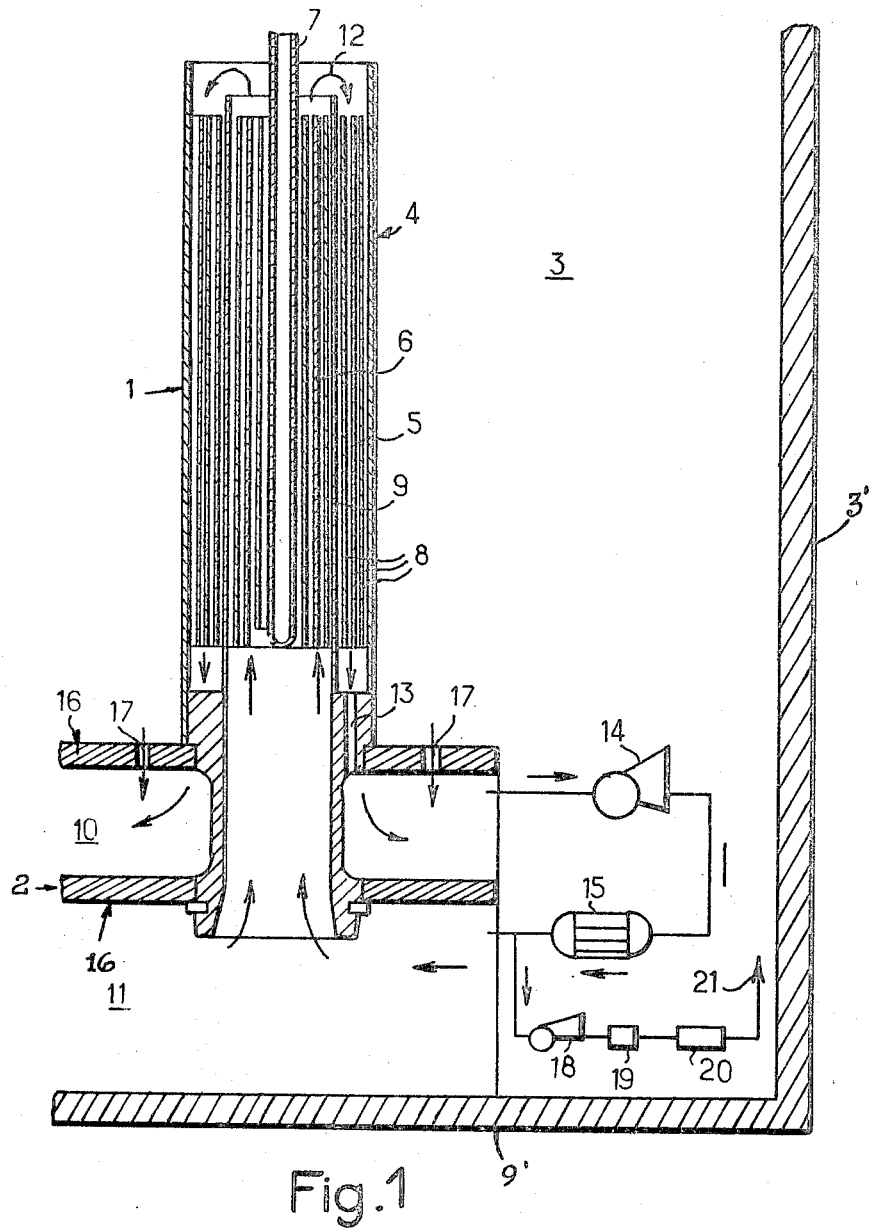
FIG. 1 is a diagrammatic representation showing the cooling water and decontamination circuits in the case of a closed fuel element.

FIG. 1 shows diagrammatically a fuel element 1 mounted on a lattice structure 2 and immersed in the pool water 3 in pool 3'. In accordance with the invention, the fuel element 1 includes a tube 4 comprising an outer compartment 5 and an inner compartment 6. In the embodiment of FIG. 1, a central tube 7 opening at its upper end into the pool water, is provided for certain experiments; several core elements can comprise such a tube 7 of a particularly large diameter, either for certain experiments or for receiving the usual control rods (not shown). The fuel elements themselves are constituted by plates 8 and the dividing wall 9 between the compartments 5 and 6 is of fissile material; the lattice structure 2 which separates the pool water 3 from the cooling water defines, with the bottom 9' of pool 3', two compartments 10 and 11. According to the invention, the cooling water enters the compartment 11 (in the direction of the arrows), ascends in the inner compartment 6 up to the return point 12, descends in the outer compartment 5 and passes into the compartment 10 through the orifice 13. At this instant, it is withdrawn by the pump 14, traverses the heat exchanger 15 and returns to the compartment 11. A new cycle then commences.

In the embodiment of FIG. 1, the fuel element is of the kind closed at its upper end; consequently, orifices such as 17 are provided in the upper plate 16 of the lattice structure 2, which permit the passage of part of the pool water 3 into the cooling circuit, in order to compensate for the water drawn off by a pump 18 (because of the high pressure existing at the withdrawal point, this pump 18 can be omitted in certain embodiments); this water, withdrawn by pump 18, successively traverses ion exchange resins 19 and a decontamination bath 20 and is finally returned at 21 into the pool water 3. In the example described, the cooling and withdrawing circuits are immersed in the water of the pool water.

Figure 2:
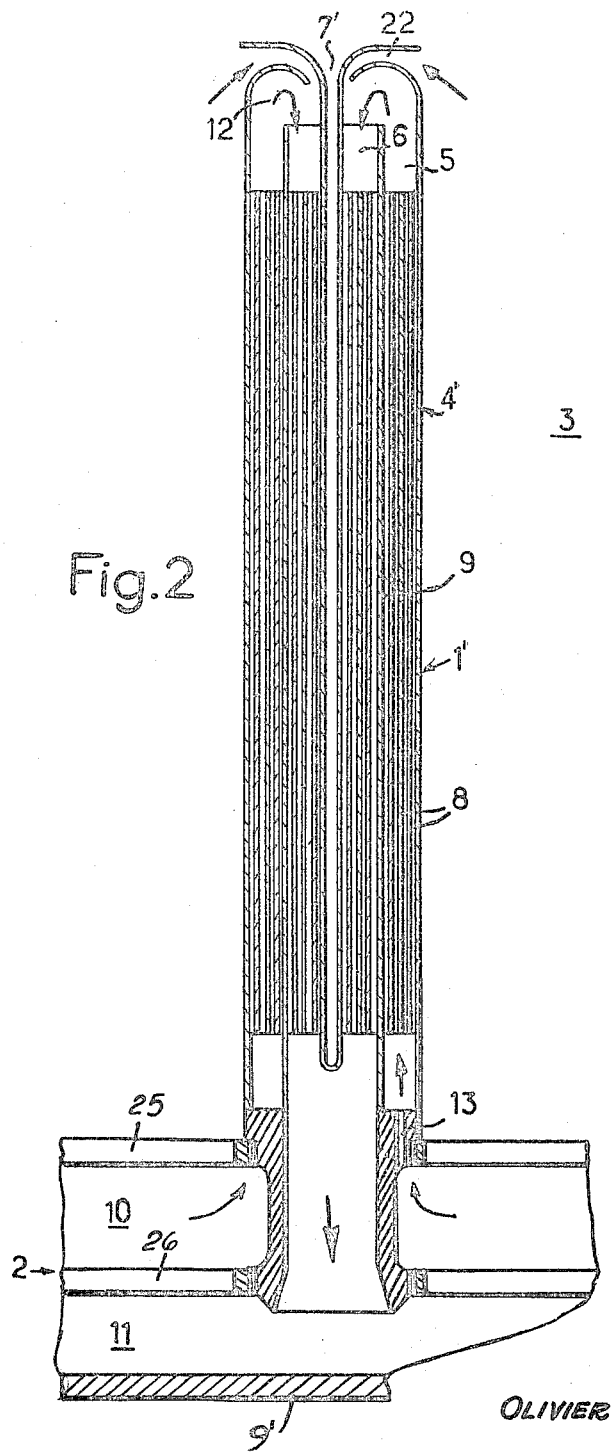
FIG. 2 is an axial section through a fuel element according to the invention, of the type permanently open at its upper part.

FIG. 2 shows a fuel element of the kind open at the upper part in which, in addition to the elements already shown in FIG. 1, there are provided inlet 22. It is through these inlets 22 that the water flow from the pool enters the cooling circuit in order to compensate for the withdrawal effected in the cooling circuit, according to the invention. In this embodiment, the cooling water circulates in the opposite direction; it ascends in the compartment 5 and descends in the compartment 6; in addition to other uses, the inlets 22 determine the absolute pressure value (pressure at the bottom of the pool) at this point in the cooling circuit.

Figure 3:
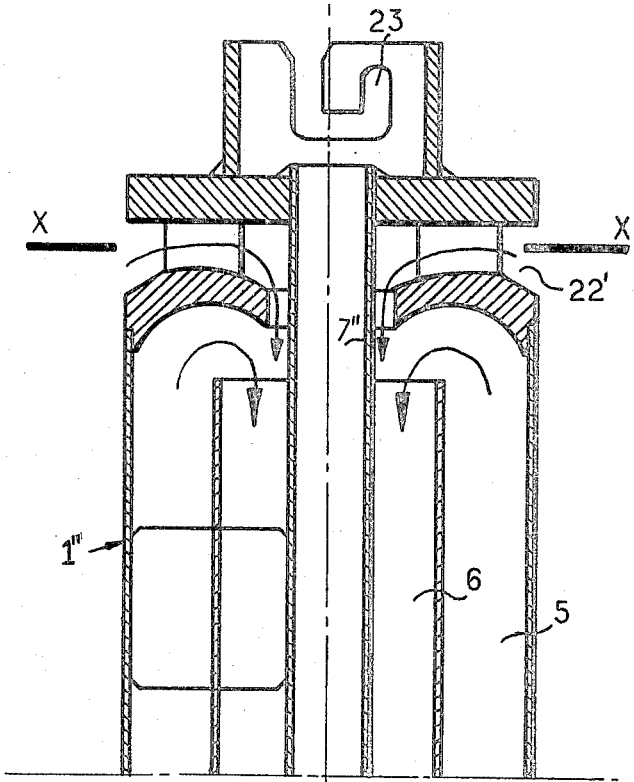
FIG. 3 is an elevational sectional view of one form of inlet provided at the upper part of a fuel element of the kind shown in FIG. 2.
Figure 4:
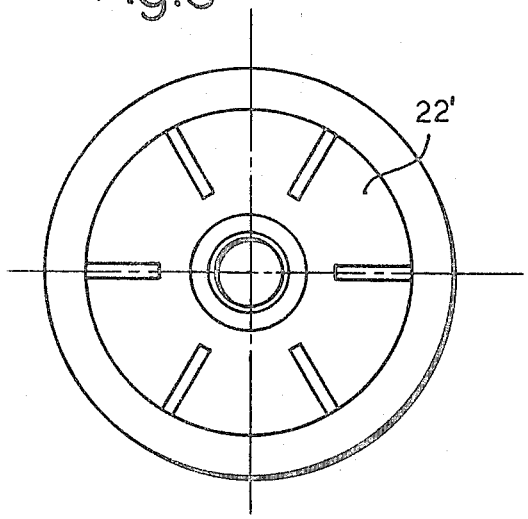
FIG. 4 is a plan view of the embodiment of FIG. 3, taken on the line X—X of FIG. 3.

FIGS. 3 and 4 show the top of a fuel element 1 of the kind open at the top. A hook 23 serves for lifting the element 1" by remote control and radial inlets, such as 22', allow the water to re-enter the inner compartment 6 (in the direction of the arrows).

FIG. 5 shows the upper and lower plates 16' and 24 of the lattice structure 2 in which a certain number of orifices, such as 25 and 26 (also shown in FIG. 2), are provided in order to receive the lower ends of the fuel unit. A single element 27 has been shown in position in FIG. 5, as well as a stopper 28 sealing the orifices in the lattice structure in the absence of a fuel element. In the embodiment of FIG. 5, the water of the cooling circuit enters the compartment 10 at 29 and then from there passes into each fuel element through the orifices 13. After circulating in each of these elements, the water leaves each element through the central part 30 and is finally collected in a collector 31, from where it is drawn towards the cooling circuit (not shown). In addition, FIG. 5 shows a structure 32 for supporting the core of the reactor, which in this example replaces the vertical armature which generally descends from a core bridge.

FIG. 6 illustrates one example of fuel elements according to the invention of the kind closed at the upper part and protected by a lead brick 33 suspended from a lifting handle 34. In this embodiment of the fuel element, a central channel 7" is provided which can be used for the introduction of certain experimental materials and the end of which is closed by a lead block 35 containing a conduit 36 for connecting the channel 7" to the pool water 3. In the embodiment of FIG. 6, the circulating direction of the water is indicated by the arrows and decontamination of the central channel 7" is ensured by a conduit 37 discharging into the orifice 13. The circulating direction chosen for this element necessitates a securing device, shown at 38 in the figure, in order to avoid displacement of the element by the flow of the cooling water. Finally, a valve (not shown in the drawing) is provided which is either automatic or remotely-controlled and which permits the top of the element to be opened.

FIG. 7 shows in detail a remotely-controlled valve which permits natural convection in the core of the reactor. To this end, a valve 39, which is normally held closed by a spring 40, is connected with a rod 41 provided with a transverse bar 42. When a manipulating mechanism, not shown, grips the rod 42 and thrusts downwards while rotating the rod 41, the valve 39 opens, permitting flow of water (in the direction of the arrows), and the bar 42 can be seated in portion 43 of 43 in a groove 44 provided in the top of the fuel element for the purpose of holding the valve 39 open. This step has to precede the removal of the element and transfer thereof to a storage container.

In one embodiment of a swimming-pool reactor improved according to the invention, the core comprises twenty-eight fuel elements of 600 mm. in height and each comprising 140 gr. of $U^{235}$, enclosed in force tubes of 76 mm. diameter and 1100 mm. height. The elements are of the circular type and include six concentric tubes of fissile material.

In these circumstances, with a cooling water flow of 500 m.$^3$ per hour, a withdrawal of 25 m.$^3$/h. and an average increase in temperature of 44°, the power withdrawn is 16 mega-watts.

We claim:

1. A process for cooling an active core of a swimming pool nuclear reactor, said core being located close to the bottom of the pool and having a plurality of fuel units, including the steps of separating said fuel units from water in said pool by a plurality of casings each containing a fuel unit, circulating heat-carrying water in each of said casings in opposite directions successively for transferring heat from said fuel units to said heat-carrying water, collecting said water downstream of said casings, deactivating at least part of said collected water, removing said heat from said collected water, returning part of said collected and deactivated water to said pool and part to said casings, and admitting a quantity of water from said pool to said circuit equal to that of said part returned to the pool.

2. A cooling system for a swimming pool nuclear reactor having a vessel open to atmosphere at its upper end, containing a shielding water in which an active core including a plurality of fuel units is immersed close to a bottom wall of said vessel, said cooling system comprising a plurality of separate casings each containing one of said fuel units and each swept by cooling water, barrier means for impressing two opposite directions of flow successively on the water in each of said casing, a cooling circuit delivering said cooling water to inlets of said casings and collecting cooling water from outlets of said casings, said circuit having deactivating means located downstream of said casing for deactivation a part of said cooling water, means for returning said deactivated water to said pool and admitting from said pool to said circuit a quantity of water equal to that delivered to said pool and an heat exchanger for cooling down said cooling water.

3. A cooling system for a swimming pool nuclear reactor according to claim 2 in which the barrier means comprises a baffle plate which divides the casing into two communicating compartments.

4. A cooling system for swimming pool nuclear reactor according to claim 3, in which the baffle-plate of each casing divides each casing into two concentric compartments.

5. A cooling system for swimming pool nuclear reactor according to claim 2 in which each of said casings has a fluid-tight connection with a header structure located near the bottom of the pool.

6. A cooling system for swimming pool nuclear reactor according to claim 5, in which the header structure comprises one inlet chamber for said heat carrying fluid and an outlet chamber, each of said chambers communicating with one of the compartments of each casing.

7. A cooling system for swimming pool nuclear reactor according to claim 2, in which said heat exchanger means are immersed in the pool water.

8. A cooling system for swimming pool nuclear reactor according to claim 2, having a header supported by said vessel, inlet and outlet chambers in said header, means for fluid tight connection of said header and casings, means for connecting said inlet and outlet chambers to inlet and outlet passages of each of said casings, respectively, and passage means connecting said outlet chamber with the pool for admission of water from said pool to said circuit.

9. A cooling system for swimming pool nuclear reactor according to claim 2 in which each of said casings is provided at its upper part with at least one inlet for admitting liquid from said pool into said circuit.

10. A cooling system for swimming pool nuclear reactor according to claim 2, in which each of said casings is provided at its upper part with a valve enabling the casing to be opened at the top.

11. A cooling system for swimming pool nuclear reactor according to claim 10, in which said valve has a closure member fast with a transverse rod which is movable in a bayonet groove provided in said casing for movement between an upper closed position and a lower open position.

References Cited by the Examiner

UNITED STATES PATENTS 2,920,025   1/1960   Anderson _____ 204—193.2
2,936,273   5/1960   Untermyer _____ 204—154.2

(Other references on following page)

| | | | |
|---|---|---|---|
| 2,938,845 | 5/1960 | Treshow | 204—154.2 |
| 2,961,393 | 11/1960 | Monson | 204—193.32 |
| 2,992,176 | 7/1961 | Echoessow | 176—62 |
| 3,141,828 | 7/1964 | Steinert et al. | 176—62 |

FOREIGN PATENTS

| | | |
|---|---|---|
| 219,722 | 1/1959 | Australia. |
| 1,198,728 | 6/1959 | France. |
| 1,051,425 | 2/1959 | Germany. |
| 817,265 | 7/1959 | Great Britain. |

OTHER REFERENCES

Directory of Nuclear Reactors, vol. II, pp. 17 to 22 and 35 to 40; published by the International Atomic Energy Agency, November 1959.

L. DEWAYNE RUTLEDGE, *Primary Examiner.*

REUBEN EPSTEIN, CARL D. QUARFORTH,
*Examiners.*

W. T. HOUGH, P. G. BETHERS, *Assistant Examiners.*